United States Patent [19]
Quintilian

[11] 3,798,745
[45] Mar. 26, 1974

[54] PRECIPITATOR PLATE PRODUCTION SYSTEM WITH LOW LEVEL BUNDLING AND TRANSPORT

[75] Inventor: Bartholomew Frank Quintilian, Baltimore, Md.

[73] Assignee: Koppers Company, Inc., Pittsburgh, Pa.

[22] Filed: Dec. 13, 1972

[21] Appl. No.: 314,713

[52] U.S. Cl. ............... 29/464, 29/200 R, 29/470.5
[51] Int. Cl. ............................................. B23q 3/00
[58] Field of Search ............ 219/86, 87, 107; 228/6; 29/33 R, 33 D, 470.5, 453, 200 R, 200 A, 208 R, 464

[56] References Cited
UNITED STATES PATENTS

| | | | |
|---|---|---|---|
| 3,708,100 | 1/1973 | Buchfuher et al. | 228/47 |
| 3,557,439 | 1/1971 | Dykeman | 29/200 A |
| 3,646,657 | 3/1972 | Small | 29/200 A |
| 3,729,798 | 5/1973 | Ejlertsen | 29/200 A |
| 3,707,257 | 12/1972 | Wogerbauer et al. | 228/6 |
| 2,506,550 | 5/1950 | Morrison | 29/200 A |
| 3,709,423 | 1/1973 | Hano et al. | 228/6 |

*Primary Examiner*—Richard J. Herbst
*Assistant Examiner*—James R. Duzan
*Attorney, Agent, or Firm*—Boyce C. Dent; Oscar B. Brumback; Olin E. Williams

[57] ABSTRACT

A production, bundling and staging system for precipitator plates of the type assembled as an array of pressure-interlocked modules with a hempiece welded across each end, including: a station equipped for welding-on the hempieces followed by drop-stacking and bundling the completed precipitator plates on a divided transfer table beneath the welding level, a shuttle car having jacks for bundle self-loading and arranged for horizontal bundle-transport from beneath the station without interrupting welding, stacking, and bundling; and a turnover fixture divided to permit the shuttle car to transfer bundles to it and flanged to stabilize bundle edges during bundle turnover and pickup by a crane for edge-down bundle storage in a shipment or other staging area.

12 Claims, 7 Drawing Figures

PRECIPITATOR PLATE PRODUCTION SYSTEM WITH LOW LEVEL BUNDLING AND TRANSPORT

CROSS REFERENCE TO RELATED APPLICATIONS

Aspects of this invention relate to the production and transfer system disclosed in the co-pending application filed herewith by BARTHOLOMEW F. QUINTILIAN, the present inventor, entitled "Plate Production System With Low Level Assembly, Stacking, And Transport", and assigned to the assignee of the present invention.

BACKGROUND OF THE INVENTION

This invention relates generally to production of composite plate structures and to preparation of same for storage and shipping.

DESCRIPTION OF THE PRIOR ART

Collecting electrodes or precipitator plates of the type assembled from roll-formed strip cut to length, are disclosed in U.S. Pat. No. 3,418,792, issued on Dec. 31, 1968, to Bartholomew F. Quintilian and Robert J. W. Williams, and entitled "Modular Collector Electrode For Electrostatic Precipitators".

Such precipitator plates have heretofore been assembled by interlocking the joints serially at one station, welding the hempieces across the ends at a second station, individually transferring the assembled precipitator plates by lifting hoist to a bundling and turnover fixture at a third station, and transferring the up-ended bundles of plates by a heavy crane to shipping or other storage areas.

This old-art sequence causes back-ups from the output end which at times limit the roll-forming operation to substantially less than rated capacity. When the heavy or plant-wide crane normally used for moving the bundles temporarily shifts to another job, production stops. While the heavy crane is being coupled to the top of an up-ended bundle on the bundling and turnover fixture (a process done slowly to protect the workman engaging the hook at considerable height above the floor) production stops at the welding station. While stacks of plates on the bundling and turn-over fixture are being squared for bundling and are being united into bundles, if any difficulty arises requiring appreciable time to correct, production stops upstream at the welding station. While the hoist operator engages the last plate assembled with the suction cups of the auxiliary hoist normally used for lifting the individual plates, and slowly and carefully lifts it from and clears it past the welding fixture, production stops at the welding station. Each time production stops at the welding station, production also stops up the line at the press and the roll former and cut-off, idling workers as well as equipment.

Other obstacles and difficulties encountered in practice of the old art method described include plate warpage caused by cumulative error induced by serial pressure interlocking of the successive modules, and difficulty in correcting such warpage after the endpieces are welded in place.

SUMMARY OF THE INVENTION

Accordingly, a principal object of the present invention is to provide economical means and method for speeding up and at the same time making safer the production of plates of the general type described, by providing a low-level, high-speed plate stacking and bundle fastening and transfer system; a further object is to provide means and method for reducing assembly-induced plate warpage by providing for simultaneous interlocking of all joints in each array of modules, and for simultaneous resistance-welding at all points at which the hempieces are fastened to the arrays of modules; other advantageous features of the invention include provision of unique retractive welding table arms, and of substantially more convenient equipment and method generally in the assembly process.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike.

DESCRIPTION OF THE PREFERRED EMBODIMENT

Figure 1:
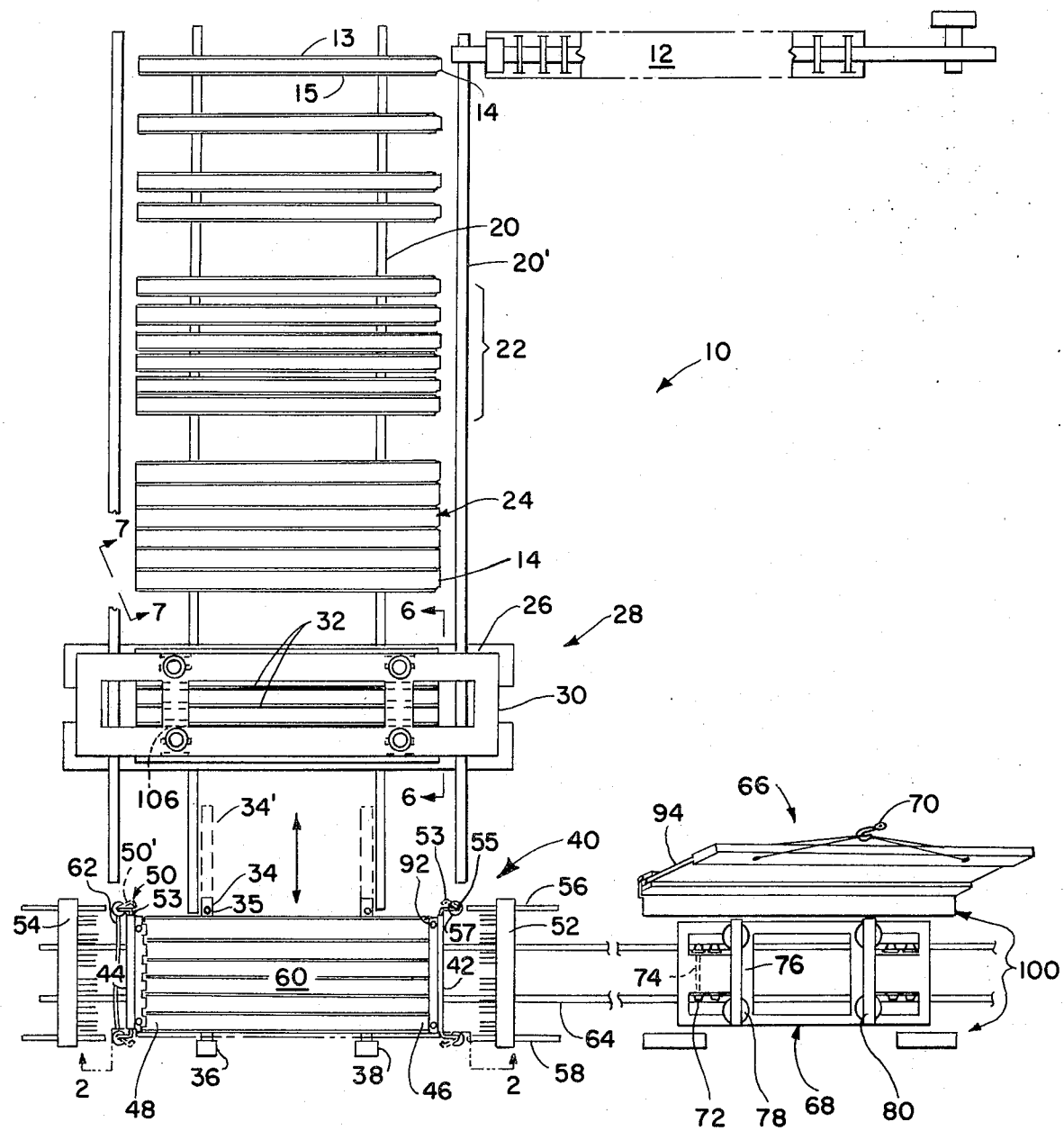
FIG. 1 is a diagrammatical plan view of a production system according to this invention.

FIG. 1 shows in schematic plan view a precipitator plate production system 10 according to this invention. Strip steel fed into a conventional roll-forming machine 12, emerges as cut-to-length roll-formed panel-like modules 14 having pressure interlockable edges 13 and 15. Modules 14 are aligned in parallel in a row on a run-out table 20, 20′ perpendicular to the end of the roll-forming machine. The table may be equipped with conveyor belts or other suitable means to facilitate movement of the modules along it.

After the modules are grouped as at 22 and loosely assembled in overlapping arrays as at 24, they are translated along the table and pass onto a press table 26 at clamping station 28. A reciprocating press 30 simultaneously applies pressure to all the joints 32 between modules in an array, clamping the modules together under pressure of blades 106.

The clamped arrays of modules pass successively onto a horizontally retractable cantilevered extension 34 of the run-out table 20. Travel and position of retraction of the extension are indicated by the double ended arrows and the dotted lines 34. Fixed supporting members 36 and 38 may be provided to receive and stabilize the cantilevered extension.

Any conventional means may be provided to insure that the array 24 is properly advanced by the extension 34 as it reciprocates outward from the end of the run-out table 20. Schematically pins 35 may be dropped in holes in extension 34 to push the trailing edge of the array and removed to permit loading of the next array onto the extension when retracted. Obviously any convention spring-ratchet would accomplish the same end automatically, engaging at position 34'.

Each clamped array 24 is supported by the extension, at a welding, stacking, bundling and transfer station 40 in position for fastening of flanged, tubular endpieces or hempieces 42 and 44 across the respective ends 46 and 48 of the array.

In the uppermost or fastening level of the station, swivel arms 50 engage and position the ends of the hempieces contiguous with the ends of the array while hempieces are being fastened by resistance welding to the ends of the array, by gang welders 52 and 54. The swivel arms comprise a horizontal angle 53 at the top, a vertical stem 55, and a supporting and actuating cylinder 57 which extends downward a sufficient distance to accommodate downward travel of the stem. Spaced tracks 56 and 58, laid transverse to the end of the run-out table 20 support and guide the gang welders as they reciprocate toward and away from the work for fastening and clearing.

After the hempieces are fastened, the run-out table extension 34 and gang welders 52 and 54 retract, leaving the completed precipitator plate 60 hanging from the swivel arms 50. As each precipitator plate is completed, all the swivel arms 50 are lowered in unison bringing the plate to rest, then are swiveled to the dotted positions 50' shown, releasing the precipitator plate in stacking position below the welding level. The swivel arms are preferably driven as a group according to well known practice, through a synchronizing linkage represented by hydraulic lines 62. The swiveling is preferably powered but may be accomplished manually by grasping the horizontal angles of the arms and pivoting them.

The precipitator plates are automatically guided into proper alignment as they are lowered, and each stack is attached together as a bundle. A shuttle car beneath the welding station self-loads each bundle in turn, and conveys it away for storage, passing beneath one of the welders on tracks 64 laid parallel with the welder tracks 56.

Figure 5:
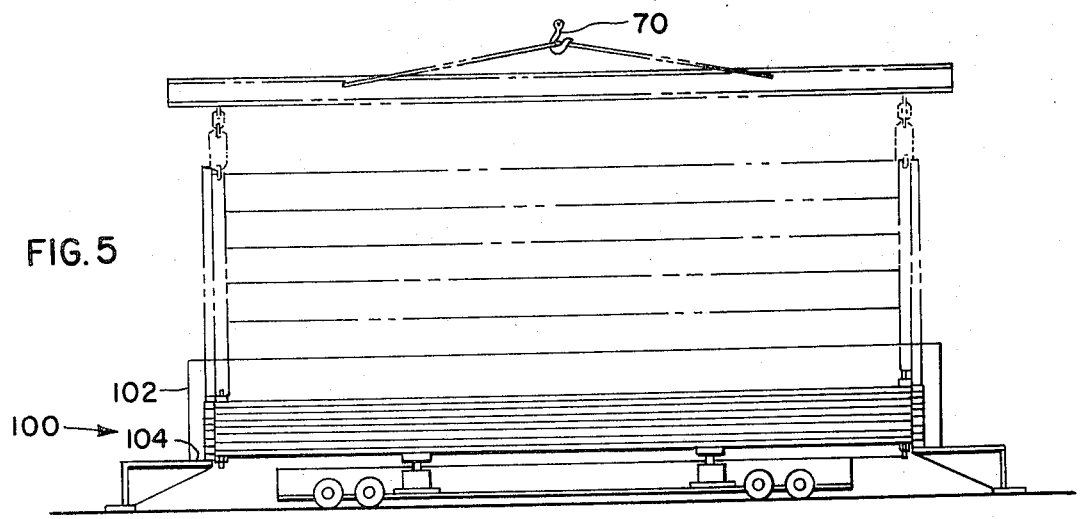
FIG. 5 is a side elevation in partial section of a transfer arrangement.

At a transfer and storage area 66, each bundle 94 is lowered and off loaded from the shuttle car 68 onto a bundle turnover fixture 100, to be described in reference to FIG. 5, from which the bundle is then removed for storage by a crane 70.

The shuttle car 68 has wheels 72 connected by axles 74. The axles support a frame 76 having a jacking system including jacks 78 and transverse beams 80 spanning the jacks, for lifting bundles of precipitator plates. Holes 92 in the precipitator plate have a function explained below.

Figure 2:
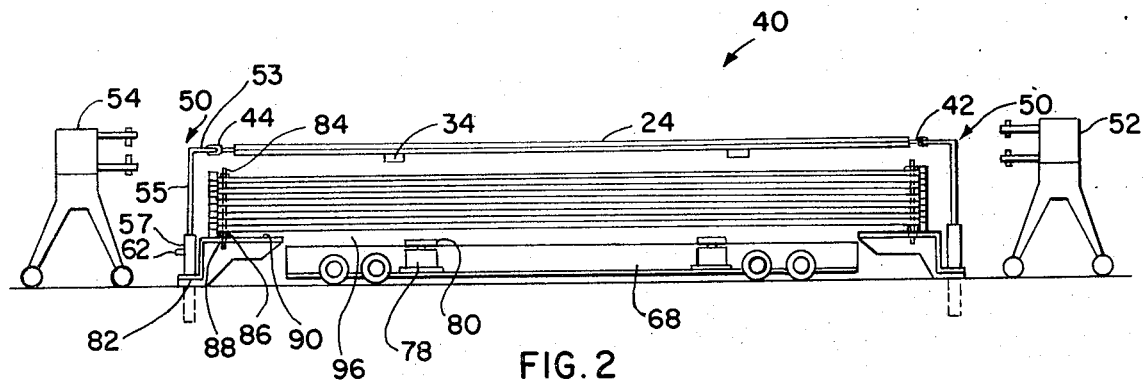
FIGS. 2 and 3 are side elevations in partial section of a welding and transfer station taken at 2—2, FIG. 1.
Figure 3:
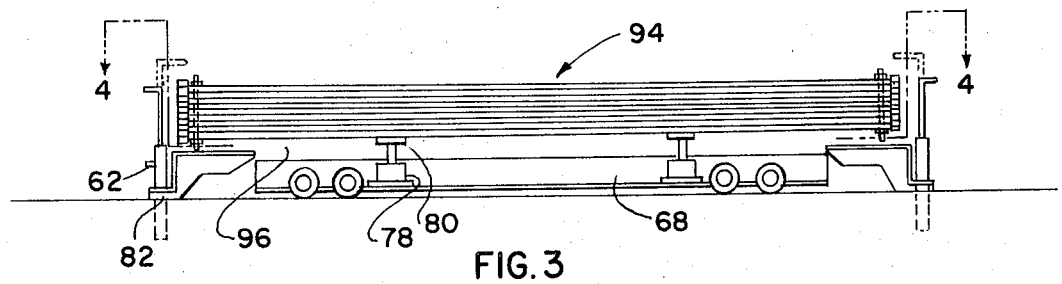
Figure 4:
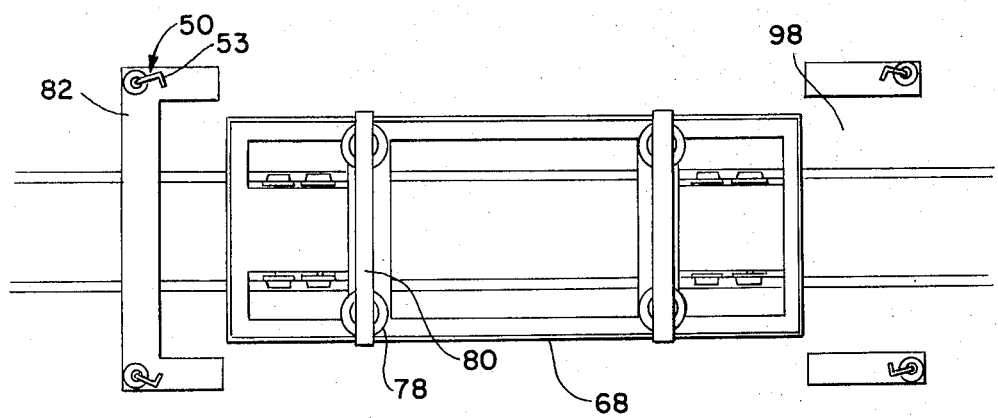
FIG. 4 is a plan viewed at 4—4, FIG. 3, with overlying structure removed to show details below.

FIGS. 2, 3 and 4, respectively side elevations in partial section and a plan with overlying parts removed to show structure below, diagrammatically detail the welding/stacking/bundling and transfer station 40. As indicated above, each array of modules 24 is first held in position for welding by the run-out table extension 34, hempieces 42 and 44 supported by swivel arms 50 are then welded in place by gang welders 52 and 54, which retract together with the runout table extension 34, clearing the way for the swivel arms to lower the precipitator plate into a stack on a base 82 or transfer frame fixed below the welding level.

The plates are guided into alignment as they descend, and are united as a bundle when the stack is complete, by bundle rods (threaded studs) 84. Each stud has a nut 86 or other enlargement near the lower end, with, however, the lower end extending some distance beyond the nut.

Base 82 has sockets 88 in the plate receiving surface 90 which slidably receive the lower ends of the studs 84 and hold the studs upright in position to engage holes 92 (FIG. 1) in the precipitator plates as the plates descend and come to rest.

When the bundle 94 is complete, the shuttle car 68 positioned below the base, loads the bundle by raising it free of the base, passing jacks 78 and cross members 80 upward through opening 96 provided in the base for the purpose.

The loaded shuttle car then laterally passes from under the base through one of the open ends 98, and between the spaced legs of and beneath the elevated transverse portion of one of the gang welders.

FIG. 5 is a side elevation diagramming a provision to protect the bundles during offloading and storing, and to make these operations safer and faster. For compactness and for other reasons, bundles are stored on edge. When one edge of a bundle is picked up by a crane 70 to rotate the bundle in preparation for deposit on-edge in storage, the bundle tends to slide off the shuttle car or other conveyance. To avoid personnel hazards and danger of damage to bundles when they shift during off-loading and turn-over, a special tipping turn-over fixture was supplied in the prior art which presented the bundles edge-on for crane hook engagement. However, this necessitated hooking-on at a height above the floor requiring considerable caution on the part of the workman engaging the hook. In the present invention a turn-over fixture 100 is provided to receive bundles from shuttle cars prior to crane pickup, and to allow low-level engagement of the hook with the bundle in horizontal position, without danger of bundle slippage when up-ended (phantom lines).

Bundle turn-over fixture 100 resembles base 82, described in reference to the welding station. Both units are open ended and divided to accommodate shuttle cars, and both have surfaces at proper height for bundle transfer by the shuttle car jacking system.

Additionally, however, the bundle turn-over fixture 100 has an upright flange 102 along one edge of the bundle receiving surface 104. The flange 102 is higher than the thickness of a bundle. After the shuttle car unloads a bundle onto the fixture and when a crane lifts one edge of the bundle, the flange 102 prevents the opposite edge of the bundle from sliding off, allowing the operation to proceed with speed and safety.

Figure 6:
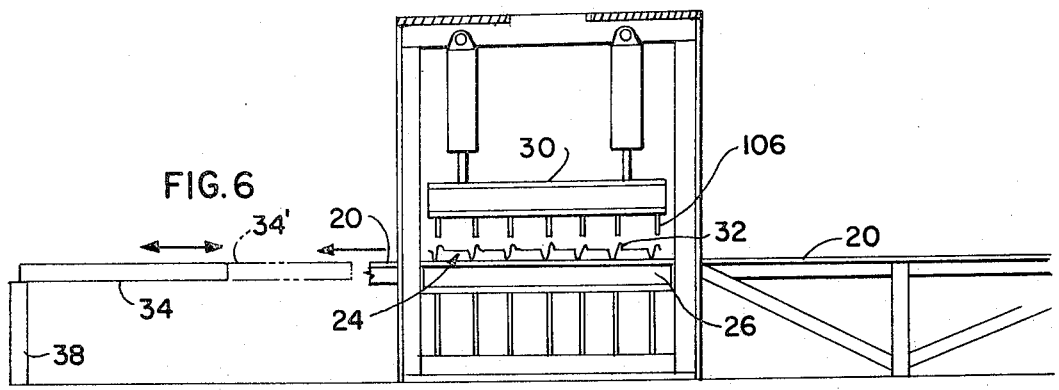
FIG. 6 is a side elevation in partial section of a clamping arrangement viewed in the direction of 6—6, FIG. 1; together with schematic depiction of details of structure to either side.

FIG. 6 is a side elevation in partial section taken at 6—6, FIG. 1, showing provision for pressure-engagement by ram system of the reciprocable ram clamping head 30 with the joints 32 of an array of modules 24 which is supported by press table 26. The clamping blades 106 are laterally spaced on the head at correct intervals to coincide with and apply pressure locally to all the joints simultaneously, keeping the assembly flat or in-plane as the joints interlock. After clamping, the arrays are transferred by conveyor belt or manually onto retractable cantilevered extension 34 of table 20, as previously described, which is preferably powered but may be manually operated.

Figure 7:
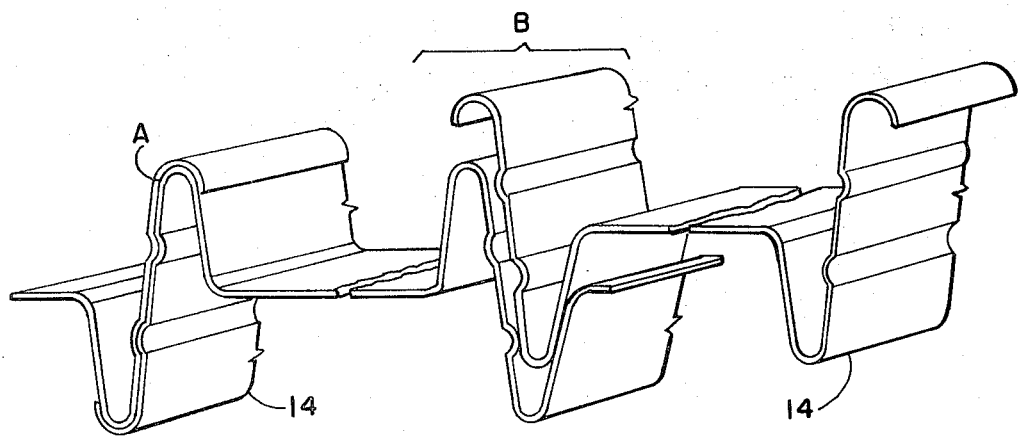
FIG. 7 is an isometric view adapted from 7—7, FIG. 1 of a pressure-interlocking array of modules of a type previously invented and representative of a stage of production in the present invention.

FIG. 7 depicts a fragment of a representative old art or prior invention array of modules 14 of the general type discussed in reference to the present invention and more particularly specified above under "Background Of The Invention".

The pressure-interlockable aspect of these modules is easily observed by contrasting the interlocked joint at "A" with the loosely overlapped joints at "B" which are in position to be interlocked by application of pressure.

Having thus described the invention in its best embodiment and mode of operation, what is described to be claimed by letters patent is:

1. In a method of assembling and staging for shipment a plurality of precipitator plates or the like, each precipitator plate being an assembly of a plurality of edge-overlapped pressure interlocked modules and a first and second hempiece respectively extending across the first and second ends of the precipitator plate, the improvement comprising the steps:

a. aligning a plurality of said modules in side-by-side horizontal array with adjacent edges overlapping;

b. simultaneously applying pressure to and interlocking all said overlapping edges;

c. horizontally translating the interlocked array of modules to a fastening station;

d. fastening a hempiece across each end of the interlocked array of modules, thereby completing assembly of a first precipitator plate;

e. lowering the precipitator plate to a fixed position beneath the fastening station;

f. repeating steps (a) through (d) and in turn lowering each precipitator plate onto the prior assembled precipitator plate beneath the fastening station, thereby producing a bundle of precipitator plates;

g. supportively engaging the bundle of precipitator plates from a position below the bundle of precipitator plates, and h. horizontally translating the bundle of precipitator plates away from beneath the fastening station to a staging location, thereby assembling and staging for shipment said plurality of precipitator plates.

2. In a method as recited in claim 1, the additional improvement comprising:

in step (e) guiding and aligning the precipitator plate during lowering;

in step (f) fastening together said bundle of precipitator plates while maintaining the guiding and aligning; and in step (g) raising said bundle by said supportive engagement, free of said fixed position prior to the horizontal translation to the staging area.

3. In a method as recited in claim 2, the additional improvement comprising:

in step (c) accomplishing said horizontal translation in a direction perpendicular to the lengths of the modules; and in step (h) accomplishing said horizontal translation away from the location of the fixed position in a direction substantially perpendicular to the direction of the horizontal translation recited in step (c).

4. In a method as recited in claim 3, the additional improvement comprising:

in step (h) passing the bundle of precipitator plates beneath the position in which a hempiece is fastened, during said horizontal translation away from the location of the fixed position.

5. In a method as recited in claim 1, the additional improvement comprising:

in step (h), up-ending the bundle of precipitator plates by lifting one edge thereof while restraining the other edge thereof from horizontal movement past a pre-determined vertical plane, and thereafter depositing the bundle of precipitator plates in said staging location.

6. In a system for producing and staging for shipment a plurality of plates, each plate comprising an edge-interlocked array of rectangular modules with first and second endpieces fixed across the respective first and second ends of the array, the improvement comprising:

means for simultaneously interlocking the edges of an array of modules, means for holding first and second of said endpieces in predetermined spaced relation, means for positioning said array of modules with the first and second ends thereof respectively contiguous with the first and second endpieces, means for affixing the first and second endpieces to the respective first and second ends of the array, thereby forming a said plate;

means for lowering the plate from the holding means, means for aligning and supporting the plate when lowered and for aligning and supporting in stacked relation on the first said plate a plurality of plates successively and similarly produced by said system, means for joining a said stack of plates in a bundle, means for lifting from beneath and laterally conveying a said bundle, and means for receiving a said laterally conveyed bundle.

7. In a system as recited in claim 6, the means for holding first and second of said endpieces comprising a plurality of arms spaced for supporting a respective plurality of ends of said endpieces, and the means for lowering the plate from the holding means comprising means for lowering said plurality of arms and means for swiveling said arms.

8. In a system as recited in claim 7, the means for aligning and supporting comprising a base having an opening arranged for receiving the means for laterally conveying, with a plurality of vertically elongate members removably held by the base in position for engaging plates lowered by the means for lowering.

9. In a system as recited in claim 8, the means for joining a stack of panels in a bundle including at least one fastener adapted for securing the upper end of one of said vertically elongate members.

10. In a system as recited in claim 9, the means for lifting from beneath and laterally conveying comprising a shuttle car, and a jacking system on the shuttle car arranged for raising and lowering a said bundle.

11. In a system as recited in claim 10, the means for receiving comprising a divided table with a surface at a level to receive a bundle lowered by said shuttle car jacking system, one edge of said surface having thereon an upright flange arranged for restraining the edge of a said bundle on the table.

12. In a system as recited in claim 11, the means for affixing including a transverse member, welding means on the transverse member, a leg supporting at least one end of the transverse member a a height sufficient for the shuttle car with a bundle raised thereon to pass beneath the transverse member.

* * * * *